(12) United States Patent
Yamamoto et al.

(10) Patent No.: US 10,654,171 B2
(45) Date of Patent: May 19, 2020

(54) OPERATION DEVICE FOR OPERATING ROBOT, ROBOT SYSTEM, AND OPERATION METHOD

(71) Applicant: FANUC CORPORATION, Yamanashi (JP)

(72) Inventors: Tomoyuki Yamamoto, Yamanashi (JP); Keita Maeda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 85 days.

(21) Appl. No.: 15/958,786

(22) Filed: Apr. 20, 2018

(65) Prior Publication Data
US 2018/0311825 A1 Nov. 1, 2018

(30) Foreign Application Priority Data

Apr. 26, 2017 (JP) .................. 2017-087433

(51) Int. Cl.
G05B 15/00 (2006.01)
G05B 19/00 (2006.01)
B25J 13/06 (2006.01)
B25J 9/16 (2006.01)
B25J 13/08 (2006.01)

(52) U.S. Cl.
CPC ............. B25J 13/06 (2013.01); B25J 9/1605 (2013.01); B25J 9/1656 (2013.01); B25J 13/08 (2013.01); B25J 13/088 (2013.01); B25J 9/161 (2013.01); G05B 2219/36168 (2013.01); G05B 2219/36401 (2013.01); G05B 2219/39446 (2013.01)

(58) Field of Classification Search
CPC ........ B25J 13/06; B25J 13/088; B25J 9/1605; B25J 9/161; B25J 9/1656; G05B 2219/36168; G05B 2219/36401; G05B 2219/39446
See application file for complete search history.

(56) References Cited

U.S. PATENT DOCUMENTS 7,203,642 B2     4/2007  Ishii et al.
9,586,324 B2 *   3/2017  Som ........................ B25J 13/06
10,076,839 B2 *  9/2018  Touma .................. B25J 9/1658
(Continued)

FOREIGN PATENT DOCUMENTS

CN          1393910 A       1/2003
CN        104582911 A       4/2015
(Continued)

Primary Examiner — Harry Y Oh
(74) Attorney, Agent, or Firm — RatnerPrestia

(57) ABSTRACT

An operation device which can reliably prevent any motion of a robot in the real space unintended by the user. An operation device includes a touch screen to display an image of a robot model and to receive a touch input, a model motion execution section to cause the robot model to make a motion in response to a touch input made by touching a surface of the touch screen, a robot motion button for causing the robot to make a motion in the real space, a motion input detection section to detect an input to the robot motion button, and a real machine motion command section to output a command to cause the robot to make an identical motion in the real space to the motion of the robot model executed by the model motion execution section as long as inputs to the robot motion button are continuously detected.

9 Claims, 13 Drawing Sheets

(56) References Cited

U.S. PATENT DOCUMENTS

| | | | |
|---|---|---|---|
| 2013/0056032 A1* | 3/2013 | Choe | A47L 9/0488 |
| | | | 134/18 |
| 2013/0176246 A1* | 7/2013 | Kohigashi | G06F 3/041 |
| | | | 345/173 |
| 2013/0326839 A1* | 12/2013 | Cho | A47L 9/2805 |
| | | | 15/319 |
| 2015/0032260 A1* | 1/2015 | Yoon | A47L 9/2857 |
| | | | 700/257 |
| 2015/0165626 A1* | 6/2015 | Desai | B25J 9/1651 |
| | | | 700/257 |
| 2015/0190925 A1 | 7/2015 | Hoffman et al. | |
| 2016/0052133 A1* | 2/2016 | Kim | A47L 9/2805 |
| | | | 700/257 |
| 2016/0096275 A1* | 4/2016 | Miyakoshi | G06F 3/04883 |
| | | | 700/264 |
| 2017/0021496 A1* | 1/2017 | Kanada | B25J 9/1656 |

FOREIGN PATENT DOCUMENTS

| | | |
|---|---|---|
| CN | 105722650 A | 6/2016 |
| JP | H08297509 A | 11/1996 |
| JP | 2006350602 A | 12/2006 |
| JP | 2012-170124 A | 9/2012 |
| JP | 2012171024 A | 9/2012 |
| JP | 2015147259 A | 8/2015 |
| JP | 2016175133 A | 10/2016 |
| JP | 2016185586 A | 10/2016 |
| JP | 2017019056 A | 1/2017 |
| WO | 98-03314 A1 | 1/1998 |

\* cited by examiner

OPERATION DEVICE FOR OPERATING ROBOT, ROBOT SYSTEM, AND OPERATION METHOD

CROSS-REFERENCE TO RELATED APPLICATION

This application is a new U.S. Patent Application that claims benefit of Japanese Patent Application No. 2017-087433, filed Apr. 26, 2017, the disclosure of this application is being incorporated herein by reference in its entirety for all purposes.

BACKGROUND OF THE INVENTION

1. Field of the Invention

The invention relates to an operation device for operating a robot, a robot system, and an operation method.

2. Description of the Related Art

There are known operation devices for jogging a robot (e.g., International Publication WO 98/03314 and Japanese Unexamined Patent Publication (Kokai) No. 2012-171024).

Technology is desired for the above-described operation devices to prevent without fail any motion of the robot in the real space unintended by the user.

SUMMARY OF INVENTION

In an aspect of the present disclosure, an operation device for operating a robot, includes a touch screen configured to display an image of a robot model modeling the robot and receive a touch input; a model motion execution section configured to move the robot model in response to the touch input made by touching a surface of the touch screen; a robot motion button for moving the robot in the real space; a motion input detection section configured to detect an input of the robot motion button; and a real machine motion command section configured to output a command for causing the robot to carry out a motion in the real space that is identical to a motion of the robot model executed by the model motion execution section, during the motion input detection section continuously detects the input of the robot motion button.

In another aspect of the present disclosure, a method of operating a robot, includes displaying an image of a robot model modeling the robot on a touch screen configured to receive a touch input; moving the robot model in response to a touch input made by touching a surface of the touch screen; detecting an input of a robot motion button for moving the robot in a real space; and outputting a command for causing the robot to carry out a motion in the real space that is identical to a motion of the robot model, during the input of the robot motion button is continuously detected.

According to an aspect of the present disclosure, the robot in the real space makes a motion during the user makes inputs to the robot motion button. According to this configuration, any motion of the robot in the real space unintended by the user is prevented without fail.

BRIEF DESCRIPTION OF THE DRAWINGS

The object, features, and advantages of the present disclosure will be clear by the description of embodiments described below, with reference to the attached drawings, in which.

DETAILED DESCRIPTION

Figure 1:
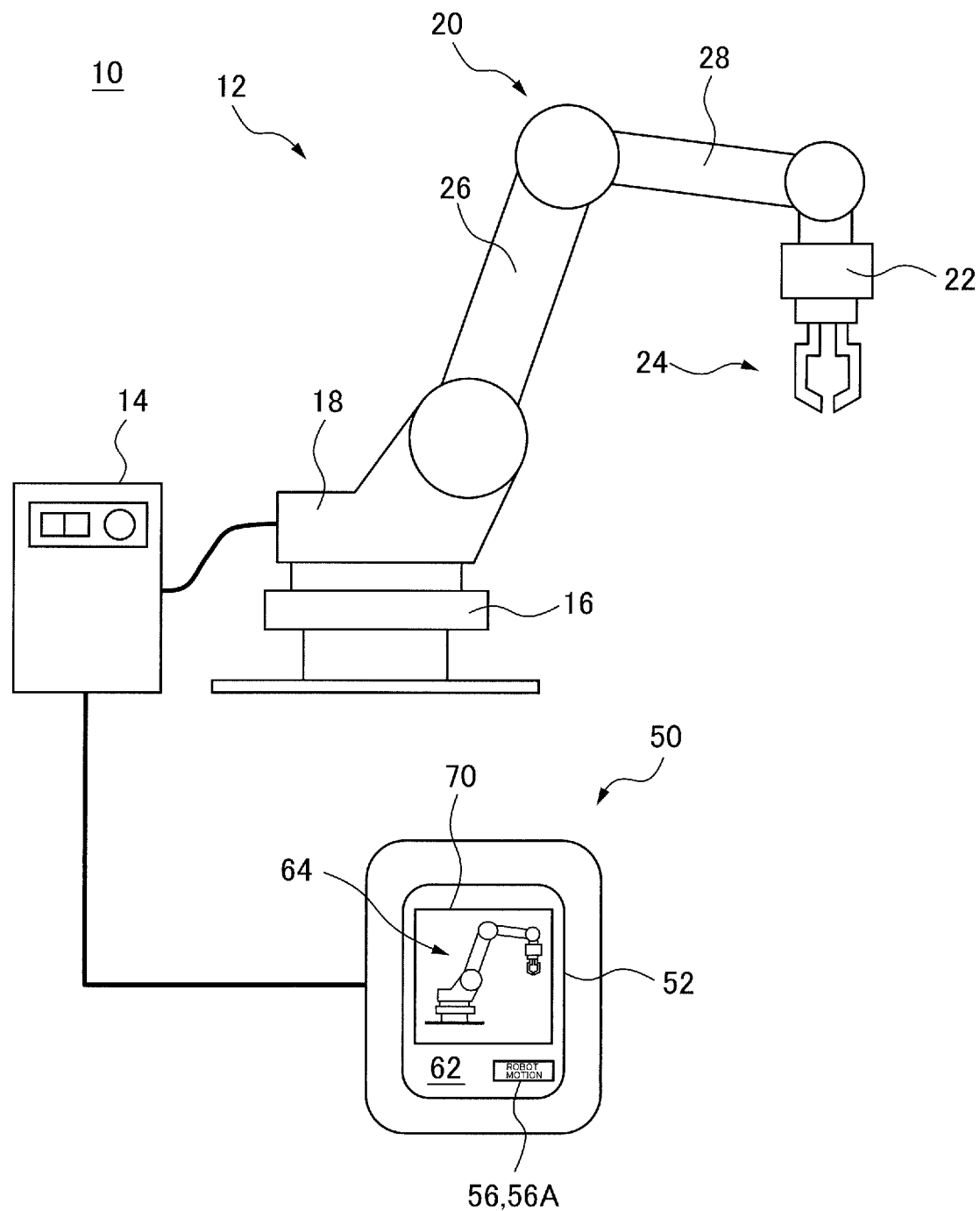
FIG. 1 is a schematic view of a robot system according to an embodiment.

Embodiments of the present disclosure will be described in detail with reference to the drawings. Note that, in various embodiments described below, similar elements are assigned the same reference numerals, and the repetitive explanations thereof will be omitted. First, a robot system 10 according to an embodiment will be described with reference to FIGS. 1 and 2.

The robot system 10 includes a robot 12, a robot controller 14 configured to control the robot 12, and an operation device 50 communicably connected to the robot controller 14. The robot controller 14 has e.g. a CPU and a memory (not illustrated), and directly or indirectly controls each component of the robot 12.

In this embodiment, the robot 12 is a vertical articulated robot, and includes a base 16, a turning body 18, a robot arm 20, a wrist 22, and an end effector 24. The base 16 is fixed on a floor in a work cell in the real space.

The turning body 18 is mounted to the base 16 so as to be rotatable about a vertical axis. The robot arm 20 includes a lower arm 26 rotatably connected to the turning body 18 and an upper arm 28 rotatably connected to a distal end of the lower arm 26. The wrist 22 is rotatably connected to a distal end of the upper arm 28, and supports the end effector 24.

Servomotors (not illustrated) are built in the turning body 18, the robot arm 20, and the wrist 22. The robot controller 14 sends commands to the servomotors so as to drive the turning body 18, the robot arm 20, and the wrist 22.

Thereby, the robot 12 can be arranged at an arbitrary position and orientation in the real space. In other words, the position and orientation of the robot 12 in the real space are defined by the rotational angles of the servomotors built in the turning body 18, the robot arm 20, and the wrist 22.

The operation device 50 is a hand-held communication device such as a tablet terminal or a smart phone, or a PC, and is communicably connected to the robot controller 14 in a wired or wireless manner.

Figure 2:
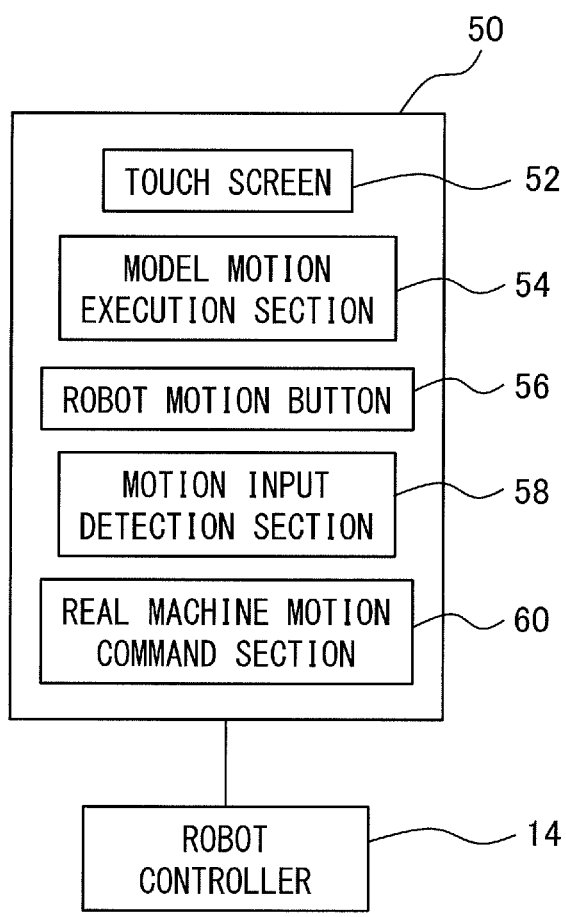
FIG. 2 is a block diagram of the operation device illustrated in FIG. 1.

As illustrated in FIG. 2, the operation device 50 includes a touch screen 52, a model motion execution section 54, a robot motion button 56, a motion input detection section 58, and a real machine motion command section 60.

The touch screen 52 displays an image 62 (FIGS. 1 and 3) and receives a touch input from the user. More specifically, the touch screen 52 includes a display such as an LCD or an organic EL display, and a touch sensor (both not illustrated) of a resistive, capacitive, inductive or other type.

The image 62 includes an image of the robot motion button 56 (FIGS. 1 and 3) and an image of a virtual space 70 including an image of a robot model 64 which models the robot 12. The robot model 64 is a three-dimensional computer graphics. The robot motion button 56 is displayed in a section in the image 62 different from the virtual space 70. The technical significance of the robot motion button 56 will be described later.

The model motion execution section 54 virtually move the robot model 64 in the virtual space 70 in response to the touch input made by the user touching the surface of the touch screen 52. This motion will be further described with reference to FIG. 3.

As an example, the model motion execution section 54 moves the robot model 64 in response to a slide touch input. The slide touch input is an input operation by the user touching the surface of the touch screen 52 with his/her finger F (or with a member that allows the touch input to the touch sensor, such as a touch pen) and sliding the finger F from the touching point in an arbitrary direction B on the surface of the touch screen 52.

For example, upon the receipt of the slide touch input to a region of the surface of the touch screen 52 (more specifically, the touch sensor) that corresponds to the display region of the virtual space 70, the model motion execution section 54 moves the robot model 64 in the virtual space 70 in response to the slide touch input.

Specifically, the user touches on a position A in the display region of the virtual space 70 on the touch screen 52 with the finger F, then slides the finger F in the direction of arrow B to a position A' while keeping to touch the touch screen 52 with the finger F, and then releases the finger F from the touch screen 52 at the position A'.

In this case, the model motion execution section 54 recognizes this touch input as a slide touch input for virtually moving the robot model 64, and moves the robot model 64 in the virtual space 70 at a position and orientation represented by the robot model 64', in response to the slide touch input.

In this embodiment, a coordinate system $C_T$ is set for the touch screen 52. The model motion execution section 54 calculates a coordinate of the start point A of the slide touch input in the coordinate system $C_T$ and a coordinate of the end point A' of the slide touch input in the coordinate system $C_T$, based on the output signal from the touch sensor of the touch screen 52.

The model motion execution section 54 then calculates a vector from the start point A to the end point A' and the magnitude of the vector from the coordinates of the start point A and the end point A', and converts the vector and the magnitude thereof to a movement direction C and a movement distance D in the virtual space 70, respectively.

Then, the model motion execution section 54 moves the component model (e.g., the end effector model modeling the end effector 24) of the robot model 64, that is to be moved, in the movement direction C by the movement distance D in the virtual space 70.

At this time, the model motion execution section 54 calculates the path of each component model of the robot model 64 in the virtual space 70 (hereinafter, referred to as "virtual jogging path"), that is necessary to move the subject component model in the movement direction C by the movement distance D.

Note that, each component model (the base model, the turning body model, the robot arm model, the wrist model) of the robot model 64 in the virtual space 70 is restricted in its movements because of e.g. the allowable rotation angle at the joint between the components, similar as the real robot 12.

Thus, the robot model 64 has a motion range the same as the real robot 12. On the other hand, each component model of the robot model 64 is not restricted in its movement speed in the virtual space 70.

Figure 3:
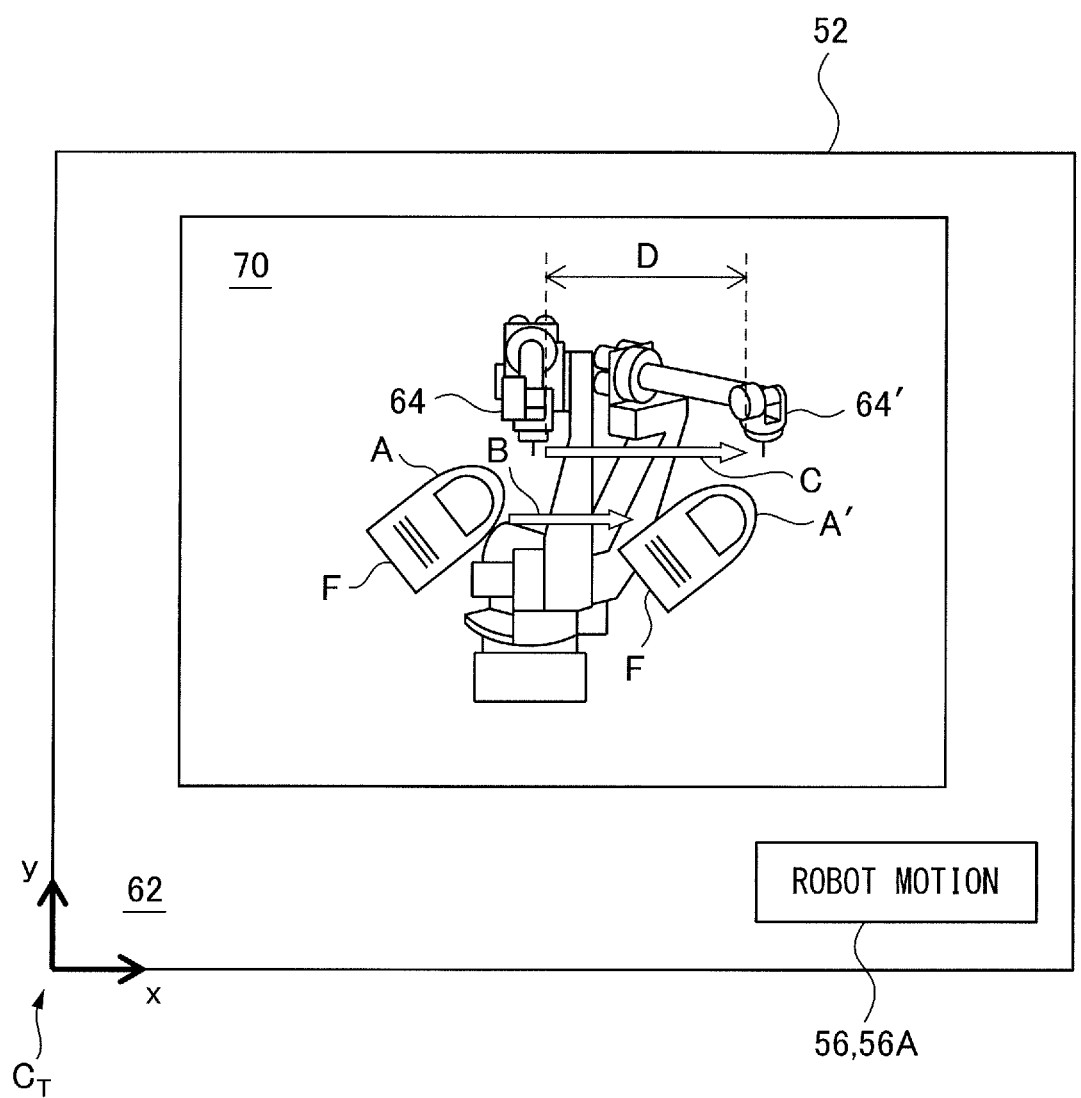
FIG. 3 illustrates an example image displayed on the touch screen of the operation device illustrated in FIG. 1.

Therefore, in the virtual space 70, the model motion execution section 54 can move the subject component model of the robot model 64 in the movement direction C by the movement distance D within the motion range of the robot model 64 at a speed equivalent to the slide touch input by the user. As a result, as illustrated in FIG. 3, the robot model 64 is moved in the virtual space 70 to the position and orientation of the robot model 64'.

As another example, instead of the above-described slide touch input, the user may make touch inputs by touching the start point A and the end point A' on the surface of the touch screen 52 to specify the start point and the end point for moving the robot model 64 in the virtual space 70. In this case, the model motion execution section 54 virtually moves the robot model 64 as described above, in response to the touch inputs onto the start point A and the end point A'.

Further, the model motion execution section 54 may receive from the user a designation of the component model to be moved. For example, the user makes a touch input onto the position on the surface of the touch screen 52, that corresponds to the position of the component model to be moved (e.g., end effector model) among the component models of the robot model 64.

In this case, the model motion execution section 54 recognizes the component model, the touch input for which has been received, as a subject component model to be moved, and moves the subject component model in the virtual space 70 in response to the slide touch input (or the touch inputs on the start point A and the end point A').

In this embodiment, the model motion execution section 54 displays both the robot model 64 before the movement and the robot model 64' after the movement in the virtual space 70. In this case, in order to visually distinguish the robot model 64 and the robot model 64', the robot model 64' may be displayed as a translucent image or dotted lines, or may be displayed in a color different from the robot model 64. Alternatively, the model motion execution section 54 may delete the robot model 64 before the movement from the image 62, after moving the robot model 64.

As an example, the operation device 50 generates motion commands for the respective servomotors in order to cause the real robot 12 to carry out an identical motion to the motion of the robot model 64 carried out by the model motion execution section 54, based on the virtual jogging path of the robot model 64, as described later.

As another example, the operation device 50 transmits information on the virtual jogging path of the robot model 64 to the robot controller 14. In this case, the robot controller 14 generates motion commands for the respective servomotors, based on the virtual jogging paths that it receives.

Subsequent to the first virtual jogging motion to virtually move the robot model 64 as described above, the model motion execution section 54 may carry out a second virtual jogging motion. More specifically, after making the first touch input (e.g., slide touch input) and releasing the finger F from the touch screen 52, the user makes a second touch input by touching a certain position on the surface of the touch screen 52 with the finger F again.

The model motion execution section 54 carries out the second virtual jogging motion to virtually move the robot model 64' in the virtual space 70, in response to the second touch input. In this way, each time the user sequentially makes an $n_{th}$ touch input ("n" is an integer not less than 2), the model motion execution section 54 carries out an $n_{th}$ virtual jogging motion in response to the $n_{th}$ touch input.

Figure 4:
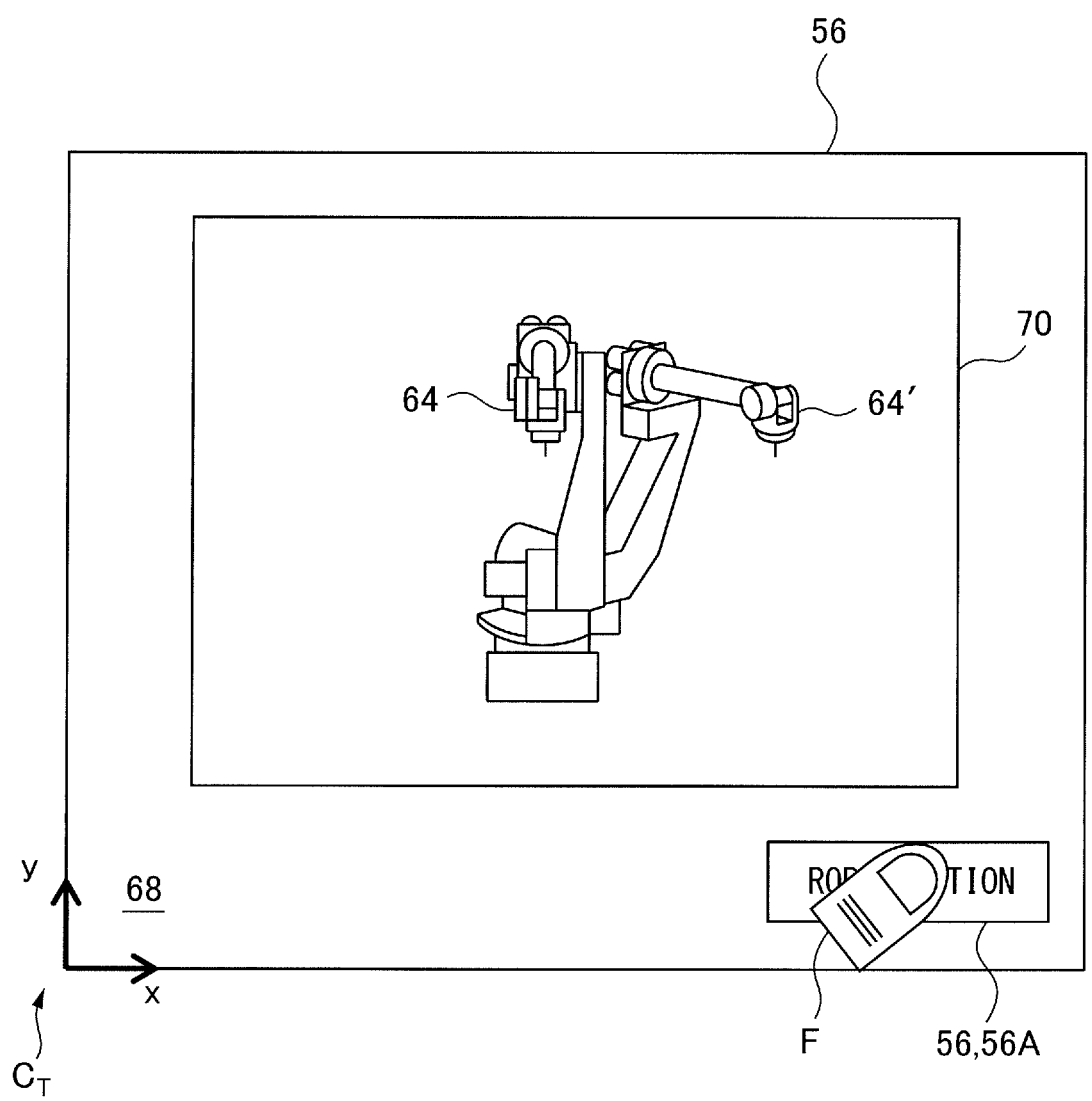
FIG. 4 illustrates a state in which the user is making an input to the robot motion button.

The motion input detection section 58 detects an input of the robot motion button 56. Specifically, the user touches the display region 56A of the robot motion button 56 on the touch screen 52 with his/her finger F, as illustrated in FIG. 4. The motion input detection section 58 detects the touch input to the display region 56A as illustrated in FIG. 4 from the output signal of the touch sensor provided in the display region 56A.

Thus, in this embodiment, the robot motion button 56 is displayed as an image on the touch screen 52, and the motion input detection section 58 detects the touch input to the display region 56A of the touch screen 52 as the input of the robot motion button 56.

The real machine motion command section 60 outputs to the robot controller 14 a command for causing the robot 12 to carry out a motion in the real space that is identical to the motion of the robot model 64 (i.e., the virtual jogging motion) carried out by the model motion execution section 54, during the motion input detection section 58 continuously detects the touch input of the display region 56A.

As an example, if the operation device 50 generates the motion commands for the respective servomotors of the robot 12, the real machine motion command section 60 transmits the generated motion commands to the robot controller 14 during the motion input detection section 58 detects the touch input to the display region 56A.

The robot controller 14 transmits the motion commands received from the real machine motion command section 60 to the respective servomotors built in the robot 12. Thus, the robot 12 carries out a motion in the real space that is identical to the virtual jogging motion executed by the model motion execution section 54.

On the other hand, when the user releases the finger F from the display region 56A and thereby the motion input detection section 58 no longer detects any touch input, the real machine motion command section 60 stops the transmission of the motion command to the robot controller 14. As a result, the robot controller 14 stops the transmission of the motion command to each servomotor of the robot 12, thereby stopping the motion of the robot 12 in the real space.

As another example, if the robot controller 14 generates the motion commands for the respective servomotor based on the virtual jogging path received from the operation device 50, the real machine motion command section 60 transmits a jogging approval command to the robot controller 14 during the motion input detection section 58 detects the touch input.

The robot controller 14 transmits the motion commands to the respective servomotors of the robot 12 so as to cause the robot 12 to carry out the motion identical to the virtual jogging motion in the real space, during the robot controller 14 is receiving the jogging approval command from the real machine motion command section 60. On the other hand, when the motion input detection section 58 no longer detects any touch input, the real machine motion command section 60 stops the transmission of the jogging approval command.

When the reception of the jogging approval command is stopped, the robot controller 14 stops the transmission of the motion commands to the servomotors of the robot 12, thereby stopping the motion of the robot 12 in the real space.

Thus, according to this embodiment, the robot 12 moves in the real space only during the user makes the touch input to the display region 56A. According to this configuration, it is possible to reliably prevent the robot 12 from unintentionally moving in the real space.

Further, in this embodiment, the user can repeatedly make the touch inputs, such as the slide touch inputs, so as to sequentially move the robot model 64 in the virtual space 70. According to this configuration, it is possible to move the robot model 64 more precisely.

Figure 5:
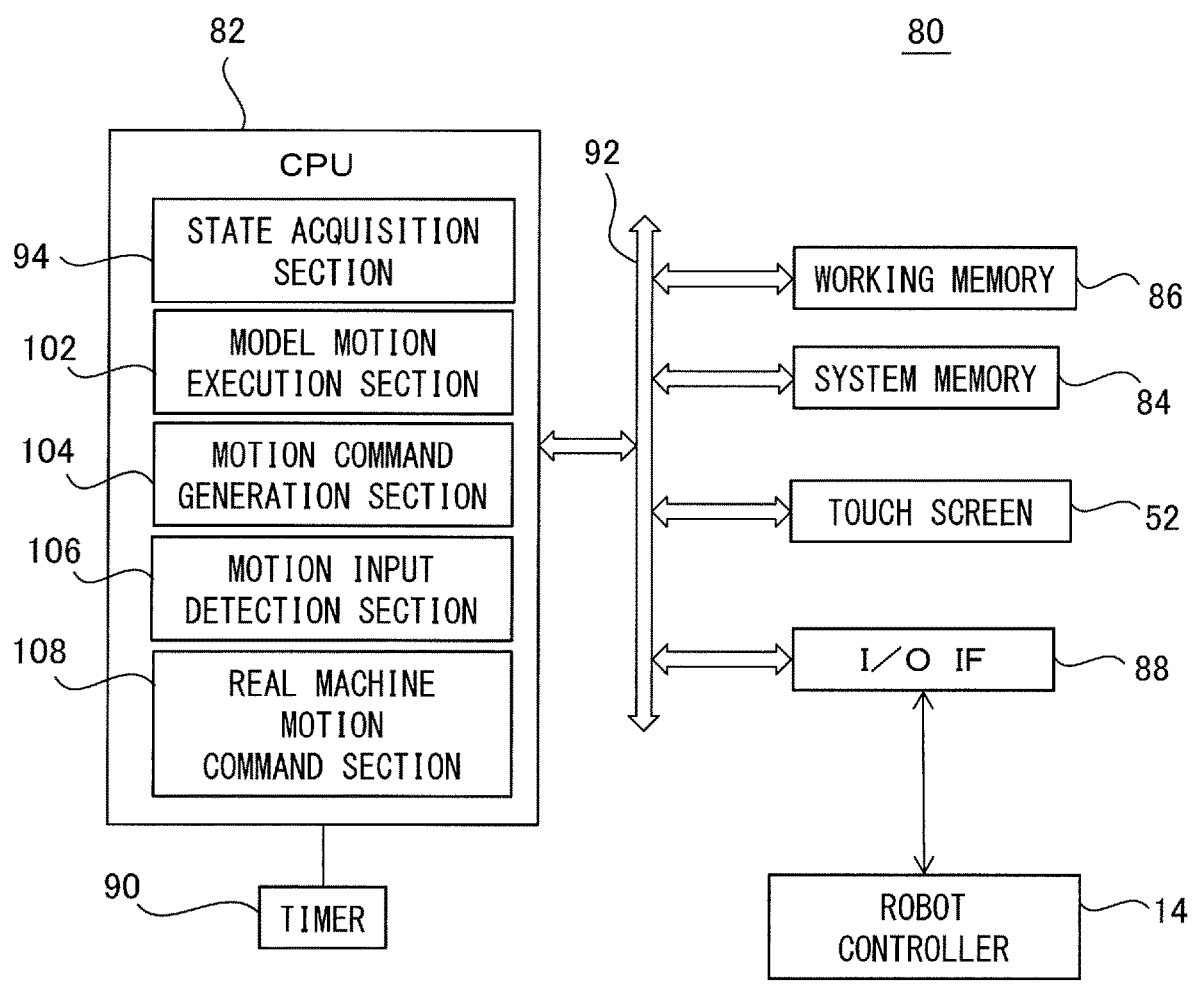
FIG. 5 is a block diagram of an operation device according to another embodiment.

With reference to FIG. 5, an operation device 80 according to another embodiment will now be described. Similarly to the above-described operation device 50, the operation device 80 is e.g. a hand-held communication device or a PC. The operation device 80 can be applied to the robot system 10 illustrated in FIG. 1 and be communicably connected to the robot controller 14, instead of the above-described operation device 50.

The operation device 80 includes a CPU 82, a system memory 84, a working memory 86, an input/output interface (I/O interface) 88, a timer 90, and the above-described touch screen 52.

The CPU 82 is communicably connected to the system memory 84, the working memory 86, the touch screen 52, and the I/O interface 88 via a bass 92, and executes various processes described later while communicating with these components.

The system memory 84 is an electrically erasable and recordable non-volatile memory, and constituted by e.g. EEPROM (registered trademark). The system memory 84 stores constants, variables, set points, programs, etc., necessary for the CPU 82 to execute the various processes described later so as not to lose them when the device 80 is shut down.

The working memory 86 temporarily stores data necessary for the CPU 82 to execute the various processes. Further, the constants, variables, set points, parameters, programs, etc., stored in the system memory 84 are appropriately loaded on the working memory 86. The CPU 82 uses the data loaded on the working memory 86 to execute the various processes.

The I/O interface 88 is communicably connected to the robot controller 14, and communicates with the robot controller 14 in accordance with the command from the CPU 82. The I/O interface 88 is constituted by e.g. an Ethernet port or a USB port, and may be in wired communication with the robot controller 14. Alternatively, the I/O interface 88 may be in wireless communication with the robot controller 14 via a wireless LAN such as Wi-Fi.

The timer 90 measure an elapsed time from a predetermined point of time in accordance with a command from the CPU 82.

Figure 6:
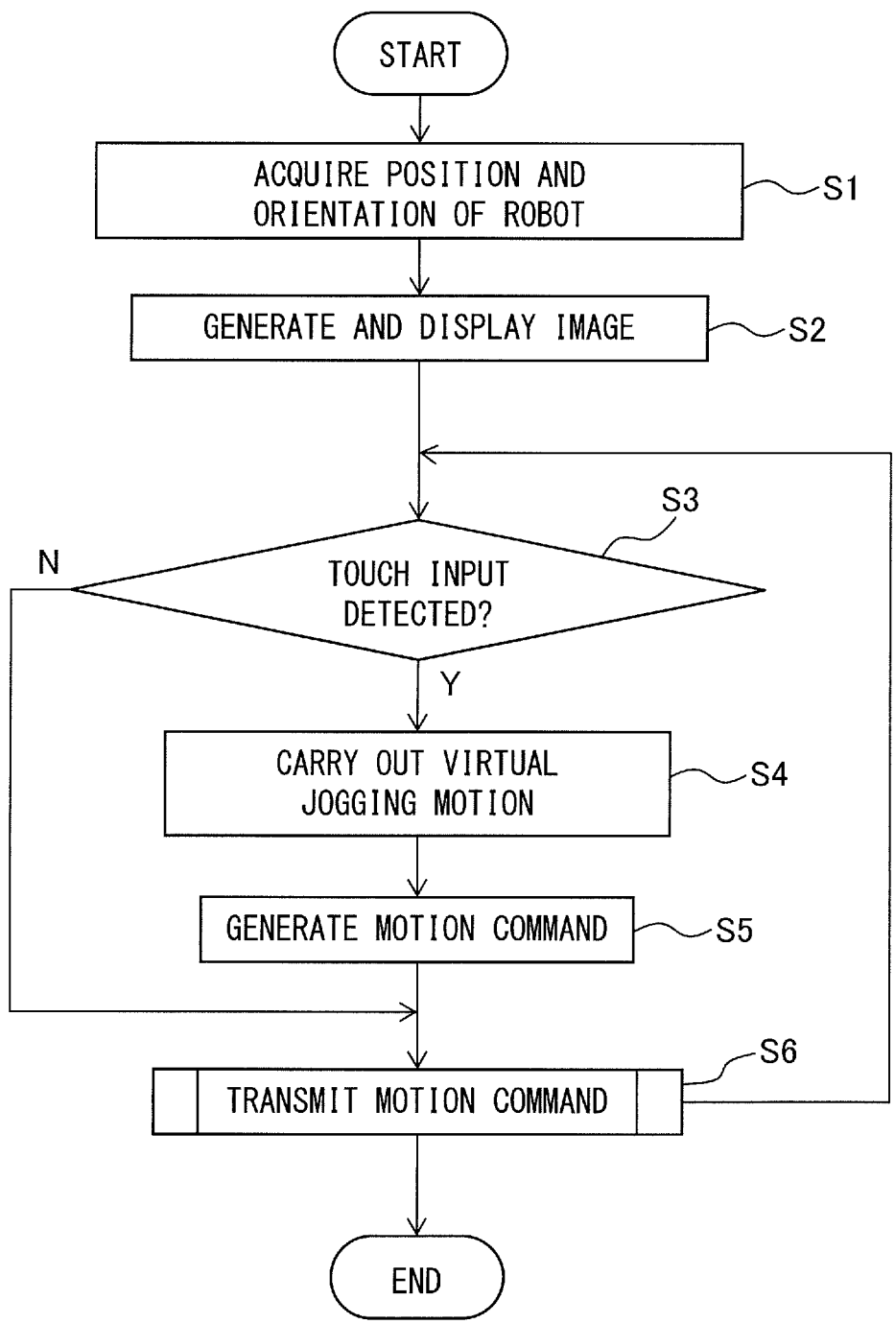
FIG. 6 is a flow chart illustrating an operation process of the operation device illustrated in FIG. 5.
Figure 7:
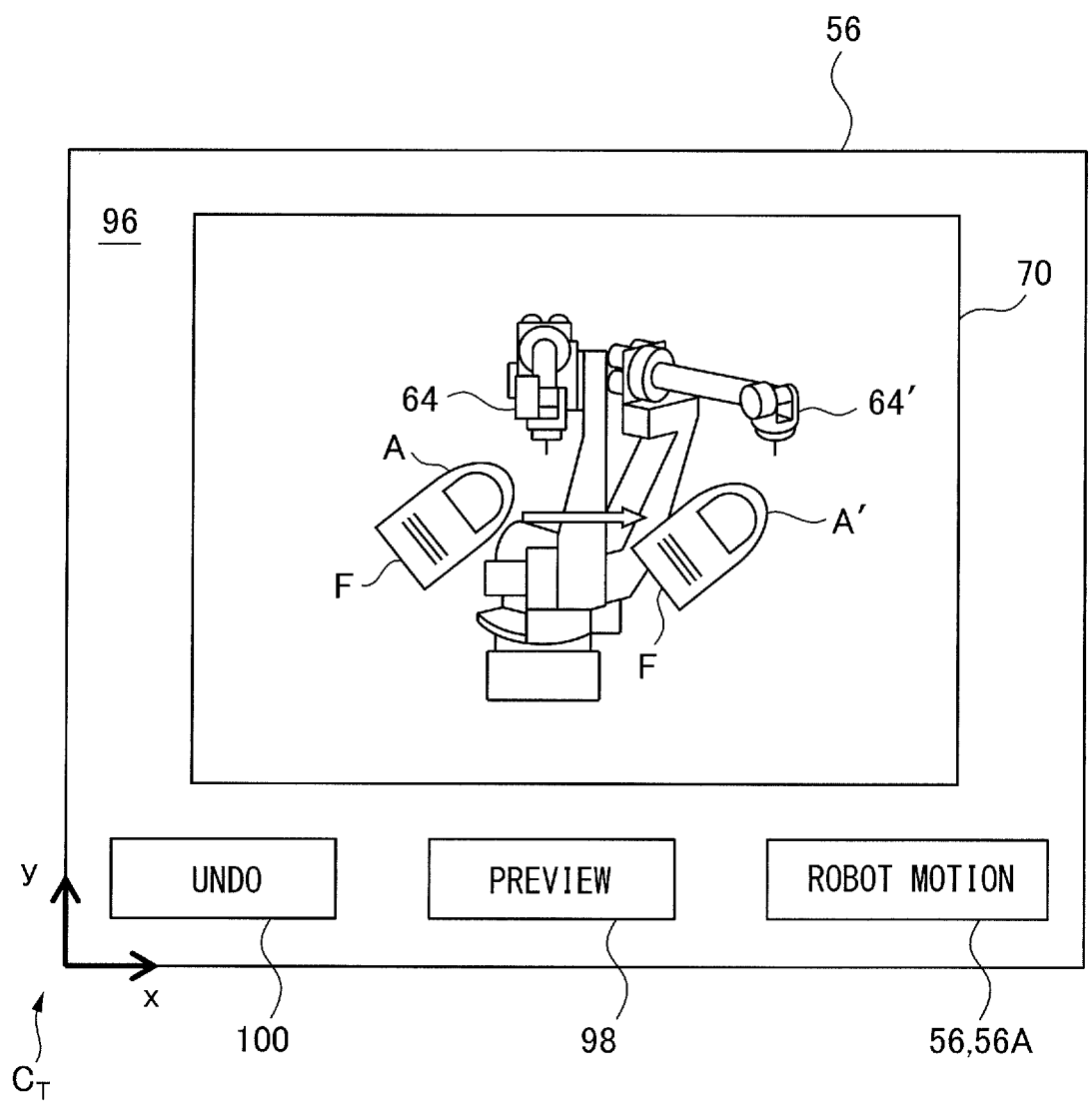
FIG. 7 is a diagram for describing steps 3 and 4 in FIG. 6 and illustrates an example image displayed on the touch screen of the operation device illustrated in FIG; 5.
Figure 8:
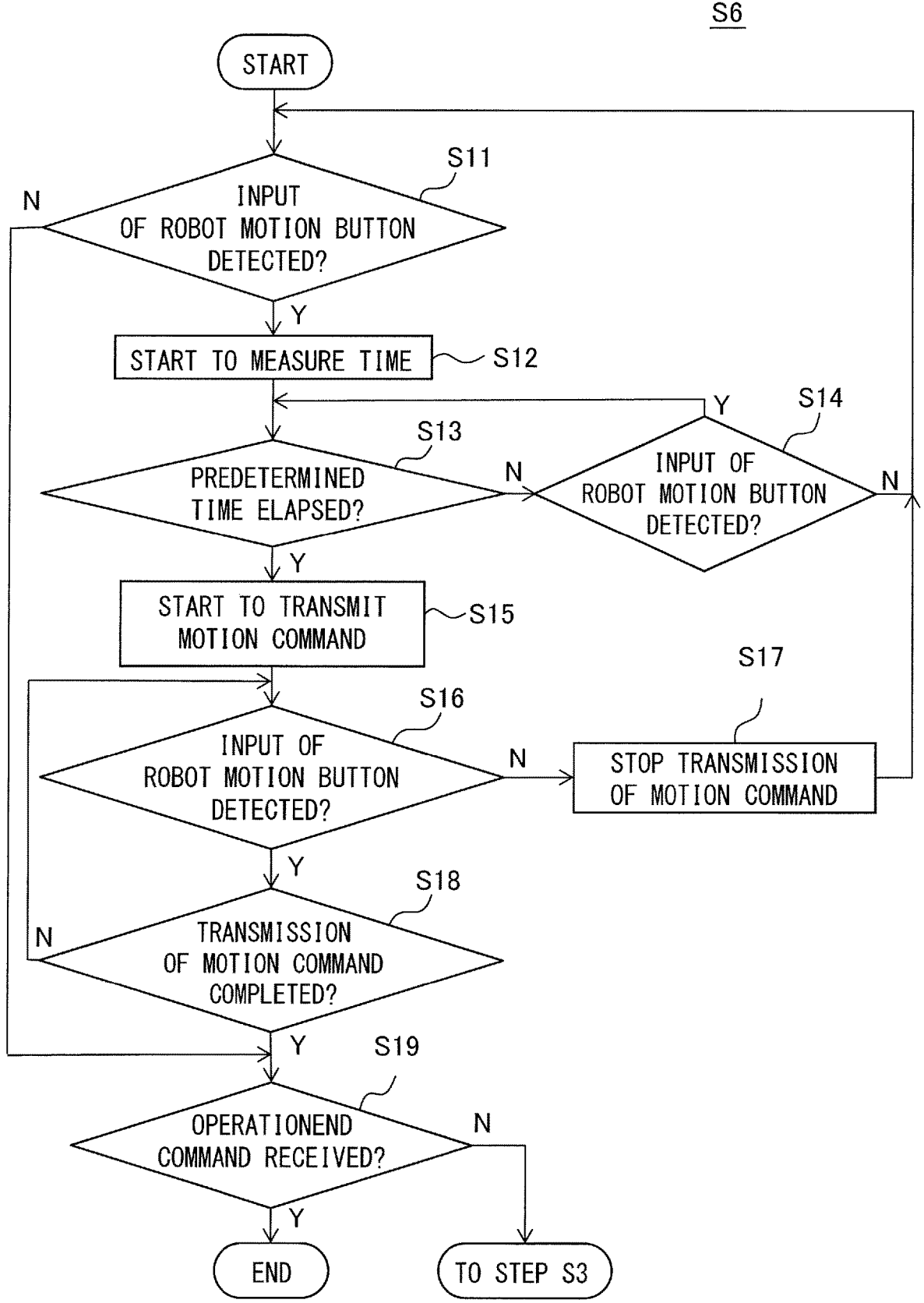
FIG. 8 is a flow chart illustrating an example process in step S6 in FIG. 6.

With reference to FIGS. 6 to 8, the operation of the operation device 80 will now be described. The process illustrated in FIG. 6 is started when the CPU 82 receives an operation-start command from the user or the robot controller 14.

At step S1, the CPU 82 acquires from the robot controller 14 the position and orientation of the robot 12 in the real space. As an example, the robot controller 14 calculates the position and orientation of each movable component (the turning body 18, the robot arm 20, and the wrist 22) of the robot 12 in the real space at the present moment, based on the rotation angle of each servomotor built in the robot 12.

The robot controller 14 then transmits the information indicative of the calculated positions and orientations to the I/O interface 88. The CPU 82 acquires the information indicative of the positions and orientations transmitted from the robot controller 14 via the I/O interface 88, and stores the information in the system memory 84.

As another example, the robot controller 14 transmits the information on the rotation angle of each servomotor built in the robot 12 to the I/O interface 88. The CPU 82 acquires the information on the rotation angle of each servomotor transmitted by the robot controller 14 via the I/O interface 88, and stores the information in the working memory 86.

The CPU 82 then calculates the position and orientation of each movable component of the robot 12 based on the rotation angles received from the robot controller 14, and stores them in the system memory 84.

Thus, in this embodiment, the CPU 82 functions as a state acquisition section 94 (FIG. 5) configured to acquire the position and orientation of the robot 12 from the robot controller 14.

At step S2, the CPU 82 generates an image including the robot model 64 and displays it on the touch screen 52. An example of this image is illustrated in FIG. 7. The image 96 illustrated in FIG. 7 includes the images of the robot motion button 56, the virtual space 70 including the robot model 64, a preview button 98, and an undo button 100.

The robot model 64 is a three-dimensional computer graphics which models the robot 12 arranged at the position and orientation acquired by the CPU 82 at step S1. The preview button 98 is displayed in a section different from the virtual space 70 and the robot motion button 56.

The undo button 100 is displayed in a section different from the virtual space 70, the robot motion button 56, and the preview button 98. The technical significance of the preview button 98 and the undo button 100 will be described later.

At step S3, the CPU 82 determines whether or not it detects a touch input by the user. For example, assume that the user makes a slide touch input by sliding his/her finger F from a start point A to an end point A' on the surface of the touch screen 52, as illustrated in FIG. 7.

The CPU 82 monitors the output signal from the touch sensor provided in the display region of the virtual space 70 on the touch screen 52, and detects the slide touch input from the start point A to the end point A'.

When the CPU 82 determines that it detects the touch input (i.e., determines YES), the process proceeds to step S4. On the other hand, when the CPU 82 determines that it does not detect the touch input (i.e., determines NO), the process proceeds to step S6.

At step S4, the CPU 82 carries out a virtual jogging motion to move the robot model 64 in the virtual space 70, in response to the touch input detected at step S3. In particular, similarly as the above-described embodiment, the CPU 82 calculates the movement direction C and the movement distance D in the virtual space 70 from the coordinates of the start point A and the end point A' of the touch input, and virtually moves the subject component model (e.g., end effector model) of the robot model 64 arranged at the position and orientation acquired in step S1 in the movement direction C by the movement distance D.

At this time, the CPU 82 calculates the virtual jogging path of each component model of the robot model 64 in the virtual space 70, and stores it in the working memory 86. As a result, the robot model 64 is moved to the position and orientation represented by the robot model 64' as illustrated in FIG. 7.

Thus, in this embodiment, the CPU 82 functions as a model motion execution section 102 (FIG. 5) configured to move the robot model 64 in response to the touch input.

At step S5, the CPU 82 generates motion commands for the respective servomotors in order to cause the real robot 12 to carry out a motion identical to the virtual jogging motion executed at step S4. More specifically, the CPU 82 generates the motion commands for the respective servomotors based on the virtual jogging path calculated at step S4, and stores them in the system memory 84.

Thus, in this embodiment, the CPU 82 generates the motion commands based on the virtual jogging path calculated from the coordinates of the start point A and the end point A' of the touch input. Accordingly, the CPU 82 functions as a motion command generation section 104 (FIG. 5) configured to generate the motion command based on the start point A and the end point A' of the touch input.

In this embodiment, when the CPU 82 detects a touch input to the display region of the preview button 98 on the surface of the touch screen 52, the CPU 82 replays in the virtual space 70 the virtual jogging motion carried out at step S4.

Specifically, when the CPU 82 detects the touch input to the preview button 98, the CPU 82 reads out from the working memory 86 the virtual jogging path calculated at step S4, and replays the motion of the robot model 64 to move along the virtual jogging path to the position and orientation of the robot model 64'. By this function, the user can check the virtual jogging motion in detail.

Further, when the CPU 82 detects a touch input to the display region of the undo button 100 on the surface of the touch screen 52, the CPU 82 cancels the virtual jogging motion carried out at step S4.

Specifically, when the CPU 82 detects the touch input to the undo button 100, the CPU 82 erases from the virtual space 70 the robot model 64' after the execution of step S4, and restores the image 96 before the execution of step S4. By this function, the user can easily cancel the virtual jogging motion if he/she has carried out an inappropriate virtual jogging motion for example.

At step S6, the CPU 82 executes a process of transmitting the motion command. This step S6 will be described with reference to FIG. 8.

At step S11, the CPU 82 determines whether or not it detects a touch input to the display region 56A of the robot motion button 56. Specifically, the CPU 82 monitors the output signal from the touch sensor of the display region 56A to determine whether or not it detects the touch input to the display region 56A.

When the CPU 82 determines that it detects the touch input to the display region 56A (i.e., determines YES), the process proceeds to step S12. On the other hand, when the CPU 82 determines that it does not detect the touch input to the display region 56A (i.e., determines NO), the process proceeds to step S19.

Thus, in this embodiment, the CPU 82 functions as a motion input detection section 106 (FIG. 5) configured to detect the input of the robot motion button 56.

At step S12, the CPU 82 starts to measure the time. More specifically, the CPU 82 sends a command to the timer 90 so as to measure the elapsed time from the point of time when it is determined YES at step S11.

At step S13, the CPU 82 determines whether or not the elapsed time t measured by the timer 90 reaches a predetermined time $t_r$. The predetermined time $t_r$ is defined by the user in advance (e.g., $t_r$=1), and pre-stored in the system memory 84.

When the CPU 82 determines that the elapsed time t reaches the time $t_r$ (i.e., determines YES), the process proceeds to step S15. On the other hand, when the CPU 82 determines that the elapsed time t does not reach the time $t_r$ (i.e., determines NO), the process proceeds to step S14.

At step S14, the CPU 82 determines whether or not it still detect the touch input to the display region 56A of the robot motion button 56. When the CPU 82 determines that it detects the touch input (i.e., determines YES), the process returns to step S13. When the CPU 82 determines that it no longer detects any touch input (i.e., determines NO), the process returns to step S11.

Note that, the CPU 82 may cyclically execute the loop of steps 13 and 14 at a period $\tau_1$ (e.g., $\tau_1$=0.2 s). Thus, if the CPU 82 continuously detects the touch input to the display region 56A for time $t_r$ (e.g., 1 second), the process proceeds to step S15.

At step S15, the CPU 82 starts to transmit the motion command to the robot controller 14. More specifically, the CPU 82 reads out from the system memory 84 the motion commands generated at step S5, and sequentially transmits the motion commands to the robot controller 14 via the I/O interface 88.

The robot controller 14 transmits the motion commands received from the CPU 82 to the respective servomotors of the robot 12. Thereby, the robot 12 carries out a motion in the real space that is identical to the virtual jogging motion executed at step S4.

At step S16, the CPU 82 determines whether or not it still detects the touch input to the display region 56A of the robot motion button 56, similar as the above-mentioned step S14. When the CPU 82 determines that it detects the touch input (i.e., determines YES), the process proceeds to step S18. When the CPU 82 determines that it no longer detects any touch input to the display region 56A (i.e., determines NO), the process proceeds to step S17.

At step S17, the CPU 82 stops the transmission of the motion command to the robot controller 14. As a result, the robot controller 14 stops the transmission of the motion commands to the servomotors of the robot 12, thereby stopping the motion of the robot 12 in the real space. Then, the CPU 82 returns to step S11.

At step S18, the CPU 82 determines whether or not the transmission of the motion commands is completed. More specifically, when all the motion commands stored in the system memory 84 at step S5 are transmitted, the CPU 82 determines YES, and the process proceeds to step S19. On the other hand, when any of the motion commands stored in the system memory 84 at step S5 is not yet transmitted, the CPU 82 determines NO, and the process returns to step S16.

Thus, in this embodiment, the CPU 82 outputs to the robot controller 14 the motion command for causing the robot 12 to carry out the motion in the real space only during the CPU 82 continuously detects the touch input to the display region 56A of the robot motion button 56 (i.e., during the loop of steps 16 and 18 is repeated).

On the other hand, the CPU 82 stops the motion of the robot 12 in the real space (step S17) when no touch input to the display region 56A is detected (i.e., determines NO at step S16).

Accordingly, in this embodiment, the CPU 82 functions as a real machine motion command section 108 (FIG. 5) configured to output a command for causing the robot 12 to carry out a motion in the real space that is identical to the virtual jogging motion, during the input of the robot motion button 56 is continuously detected. Note that, the CPU 82 may cyclically execute the loop of steps S16 and S18 at a period $\tau_2$ (e.g., $\tau$=0.5 s).

At step S19, the CPU 82 determines whether or not it receives an operation end command from the user or the robot controller 14. When the CPU 82 determines that it receives the operation end command (i.e., determines YES), the CPU 82 ends step S6 illustrated in FIG. 8, thereby ending the process illustrated in FIG. 6.

On the other hand, when the CPU 82 determines that it does not detects the operation end command (i.e., determines NO), the process returns to step S3 in FIG. 6. Then, the CPU 82 repeatedly executes the loop of steps S3 to S6 until it determines YES at step S19.

In this way, each time the CPU 82 detects an $n_{th}$ touch input ("n" is an integer not less than 2) at step S3, the CPU 82 executes an $n_{th}$ virtual jogging motion in response to the $n_{th}$ touch input at step S4.

Then, each time the CPU 82 executes step S4, the CPU 82 generates an $n_{th}$ motion command (step S5) for causing the robot 12 to carry out an identical motion to the $n_{th}$ virtual jogging motion, and sequentially stores the command in the system memory 84.

Thus, according to this embodiment, since the robot is moved in the real space only during the user makes the touch input to the display region 56A, it is possible to reliably prevent any motion of the robot 12 in the real space that is not intended by the user.

Further, in this embodiment, the user can repeatedly make the touch input so as to sequentially jog-feed the robot model 64 in the virtual space 70. According to this configuration, the virtual jogging motion of the robot model 64 can be executed more precisely.

Further, in this embodiment, the CPU 82 functions as the state acquisition section 94 to acquire the position and orientation of the real robot 12 (step S1), and functions as the model motion execution section 102 to move the robot model 64 arranged at the acquired position and orientation (step S4). According to this configuration, the real robot 12 and the robot model 64 in the virtual space 70 can be synchronized.

Further, in this embodiment, the CPU 82 functions as the motion command generation section 104 to generate the motion command, which is to be transmitted to the real robot 12, in the operation device 80. According to this configuration, it is possible to reduce arithmetic processing in the robot controller 14 when the robot 12 is operated with using the operation device 80, and therefore the load on the resource of the robot controller 14 can be reduced.

Next, with reference to FIG. 9, an operation device 110 according to yet another embodiment will be described. Similarly to the above-described operation device 50, the operation device 110 is e.g. a hand-held communication device or a PC. The operation device 110 can be applied to the robot system 10 illustrated in FIG. 1 and be communicably connected to the robot controller 14, instead of the above-described operation device 50.

The operation device 110 differs from the operation device 80 illustrated in FIG. 5 in the configuration of a touch screen 52'. Specifically, the touch screen 52' includes a force detection section 112, in addition to the display and the touch sensor (both not illustrated).

The force detection section 112 includes e.g. a strain gauge or a force sensor, and detects a force F applied to the surface of the touch screen 52' when the user makes a touch input to the surface of the touch screen 52'. The force detection section 112 may be provided only in the display region 56A. In this case, the force detection section 112 detects a force F of a touch input only to the display region 56A.

Alternatively, the force detection section 112 may be provided in all region of the touch screen 52', and detect a force F of a touch input to any point on the surface of the touch screen 52'. The CPU 82 acquires information on the force F detected by the force detection section 112, and stores it in the system memory 84.

An operation of the operation device 110 will now be described. The CPU 82 of the operation device 110 executes the process illustrated in FIG. 6, similarly as the operation device 80. The operation process of the operation device 110 differs from that of the operation device 80 in step S6.

Figure 10:
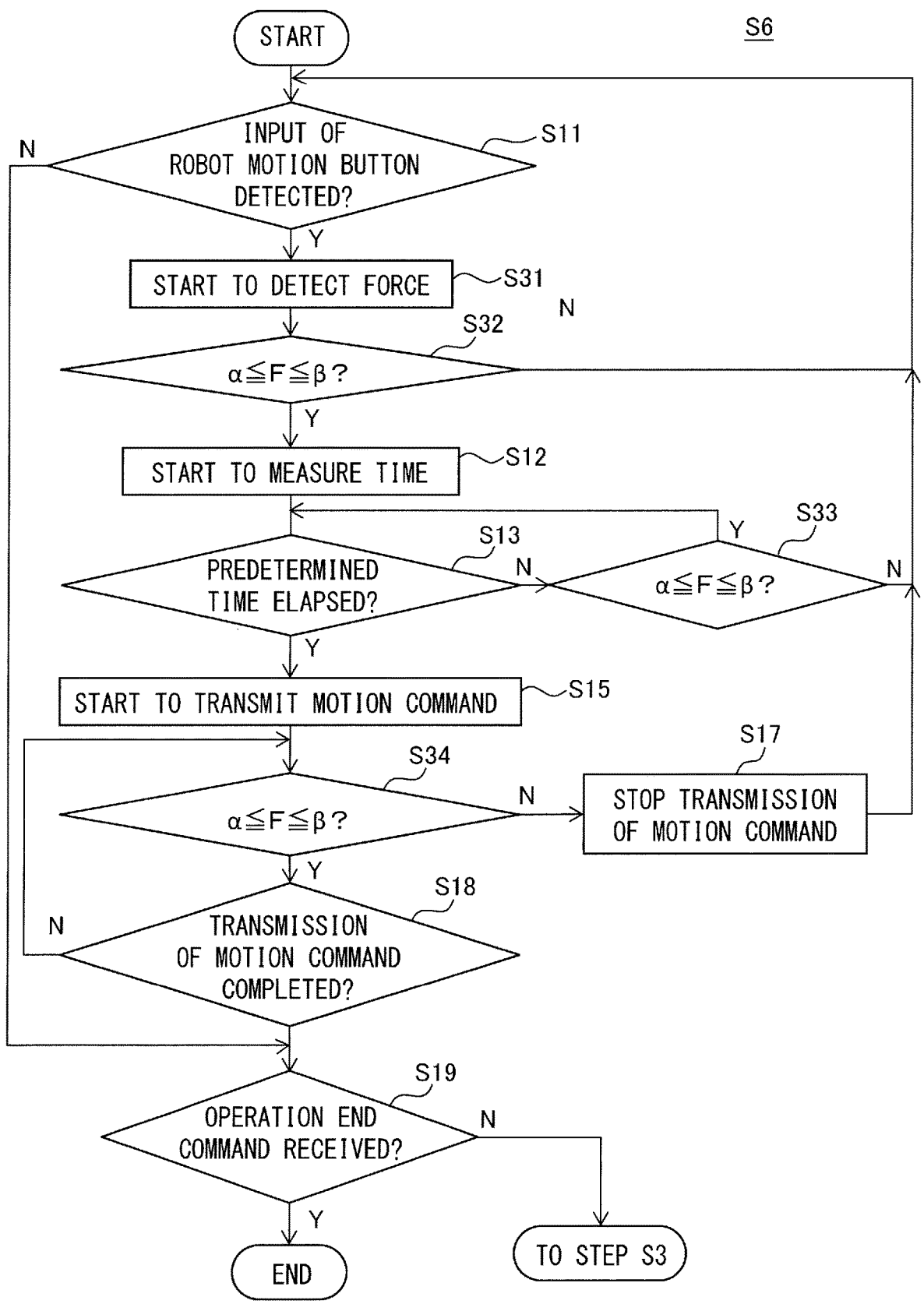
FIG. 10 is a flow chart illustrating an example operation process in step S6 executed by the operation device illustrated in FIG. 5.

Below, with reference to FIG. 10, the process of step S6 according to this embodiment will be described. Note that, in the flow illustrated in FIG. 10, the processes similar as those in FIG. 8 are assigned the same step numbers, and the repetitive explanations thereof will be omitted.

When it is determined YES at step S11, at step S31, the CPU 82 starts to detect the force F. Specifically, the CPU 82 sends a force detection command to the force detection section 112. When receiving the force detection command, the force detection section 112 periodically detects the force F applied to the display region 56A, and sequentially transmits information on the detected force F to the CPU 82. The CPU 82 acquires from the force detection section 112 the force F of the touch input to the display region 56A, and sequentially stores the force F in the system memory 84.

At step S32, the CPU 82 determines whether or not the most-recently acquired force F is within a predetermined allowable range ([α, β]). The predetermined allowable range [α, β] is defined by the user in advance, and stored in the system memory 84.

When the most-recently acquired force F is within the allowable range (α≤F≤β), the CPU 82 determines YES and proceeds to step S12. On the other hand, when the most-recently acquired force F is out of the allowable range (F<α or β<F), the CPU 82 determines NO and returns to step S11.

When it is determined NO at step S13, at step S33, the CPU 82 determines whether or not the most-recently acquired force F is still within the allowable range ([α, β]), similarly as step S32.

When the CPU 82 determines that α≤F≤β (i.e., determines YES), the process returns to step S13. On the other hand, when the CPU 82 determines that F<α or β<F (i.e., determines NO), the process returns to step S11.

After step S15, or when it is determined NO at step S18, at step S34, the CPU 82 determines whether or not the most-recently acquired force F is still within the allowable range ([α, β]), similarly as step S32.

When the CPU 82 determines that α≤F≤β (i.e., determines YES), the process proceeds to step S18. On the other hand, when the CPU 82 determines that F<α or β<F (i.e., determines NO), the process proceeds to step S17. Note that, the CPU 82 may cyclically execute the loop of steps S34 and S18 at a period $\tau_2$ (e.g., $\tau_2$=0.5 s).

In this embodiment, the CPU 82 transmits the motion command to the robot controller 14 only during the force F of the touch input to the display region 56A is within the allowable range. According to this configuration, the user needs to press the display region 56A with a predetermined force in order to move the robot 12 in the real space.

On the other hand, if the user unintentionally release the finger F from the display region 56A, or if the user unintentionally presses the display region 56A more strongly, the motion of the robot 12 in the real space is stopped. Accordingly, it is more reliably prevent any motion of the robot 12 in the real space that is not intended by the user.

Figure 11:
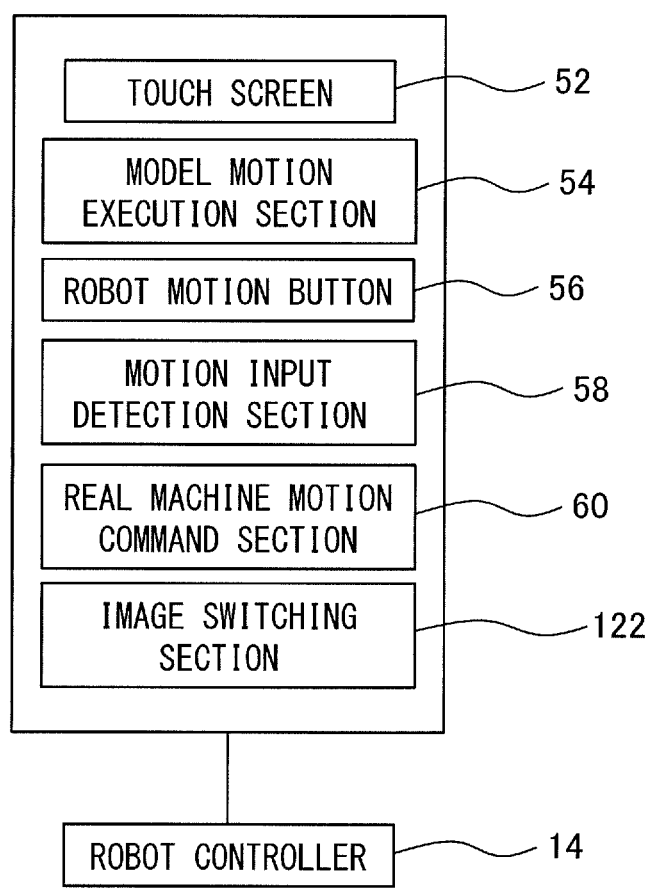
FIG. 11 is a block diagram of an operation device according to still another embodiment.

Next, with reference to FIG. 11, an operation device 120 according to still another embodiment will be described. The operation device 120 differs from the above-described operation device 50 in the feature wherein the operation device 120 further includes an image switching section 122.

The image switching section 122 switches the image of the robot model 64 to a second image of the robot model 64 viewed from a direction different from the original image, in response to a predetermined type of touch input to the surface of the touch screen 52.

This function will be described with reference to FIGS. 12 and 13. In the example illustrated in FIG. 12, the touch screen 52 displays an image 114. The image 114 includes an image of a group of image-switching buttons 124, in addition to the images of the robot motion button 56, the virtual space 70, the preview button 98, and the undo button 100.

The group of image-switching buttons 124 includes a first image-switching button 124A, a second image-switching button 124B, a third image-switching button 124C, a fourth image-switching button 124D, and a fifth image-switching button 124E.

In this embodiment, a coordinate system $C_v$ for reference of directions is set in the virtual space 70. The first image-switching button 124A is for switching the current image of the robot model 64 in the virtual space 70 to an image viewed from the z-axis positive direction of the coordinate system $C_v$.

The second image-switching button 124B is for switching the current image of the robot model 64 in the virtual space 70 to an image viewed from the x-axis positive direction of the coordinate system $C_v$. The third image-switching button 124C is for switching the current image of the robot model 64 in the virtual space 70 to an image viewed from the x-axis negative direction of the coordinate system $C_v$.

The fourth image-switching button 124D is for switching the current image of the robot model 64 in the virtual space 70 to an image viewed from the y-axis negative direction of the coordinate system $C_v$. The fifth image-switching button 124E is for switching the current image of the robot model 64 in the virtual space 70 to an image viewed from the y-axis positive direction of the coordinate system $C_v$.

Figure 12:
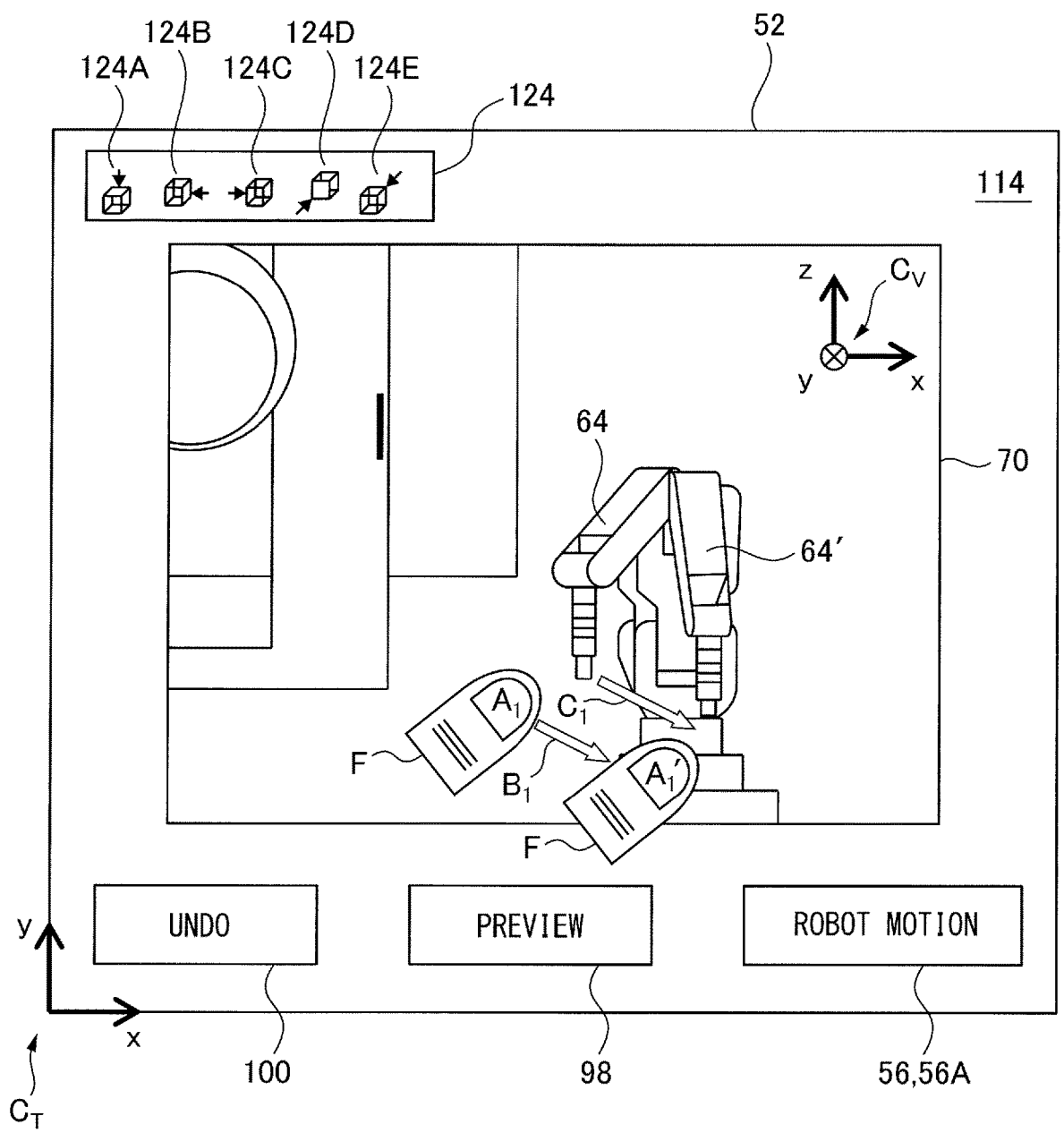
FIG. 12 illustrates an example image displayed on the touch screen of the operation device illustrated in FIG. 11.

The image 114 illustrated in FIG. 12 depicts the image of the robot model 64 in the virtual space 70 viewed from the y-axis negative direction of the coordinate system $C_v$ (i.e., from the direction defined by the fourth image-switching button 124D).

For example, the user makes a first slide touch input by sliding his/her finger F from a start point $A_1$ to an end point $A_1'$ in a direction $B_1$ when the touch screen 52 displays the robot model 64 illustrated in FIG. 12.

In response to the first slide touch input, the model motion execution section 54 moves the robot model 64 in the virtual space 70 in the direction $C_1$ to the position and orientation represented by the robot model 64'. Along with this, the model motion execution section 54 calculates a first virtual jogging path in the virtual space 70 of each component model of the robot model 64.

Assume that the user then touches the display region of the second image-switching button 124B on the surface of the touch screen 52. In this case, the image switching section 122 detects the touch input to the second image-switching button 124B, and switches the image 114 illustrated in FIG. 12 to an image 114' illustrated in FIG. 13.

Figure 13:
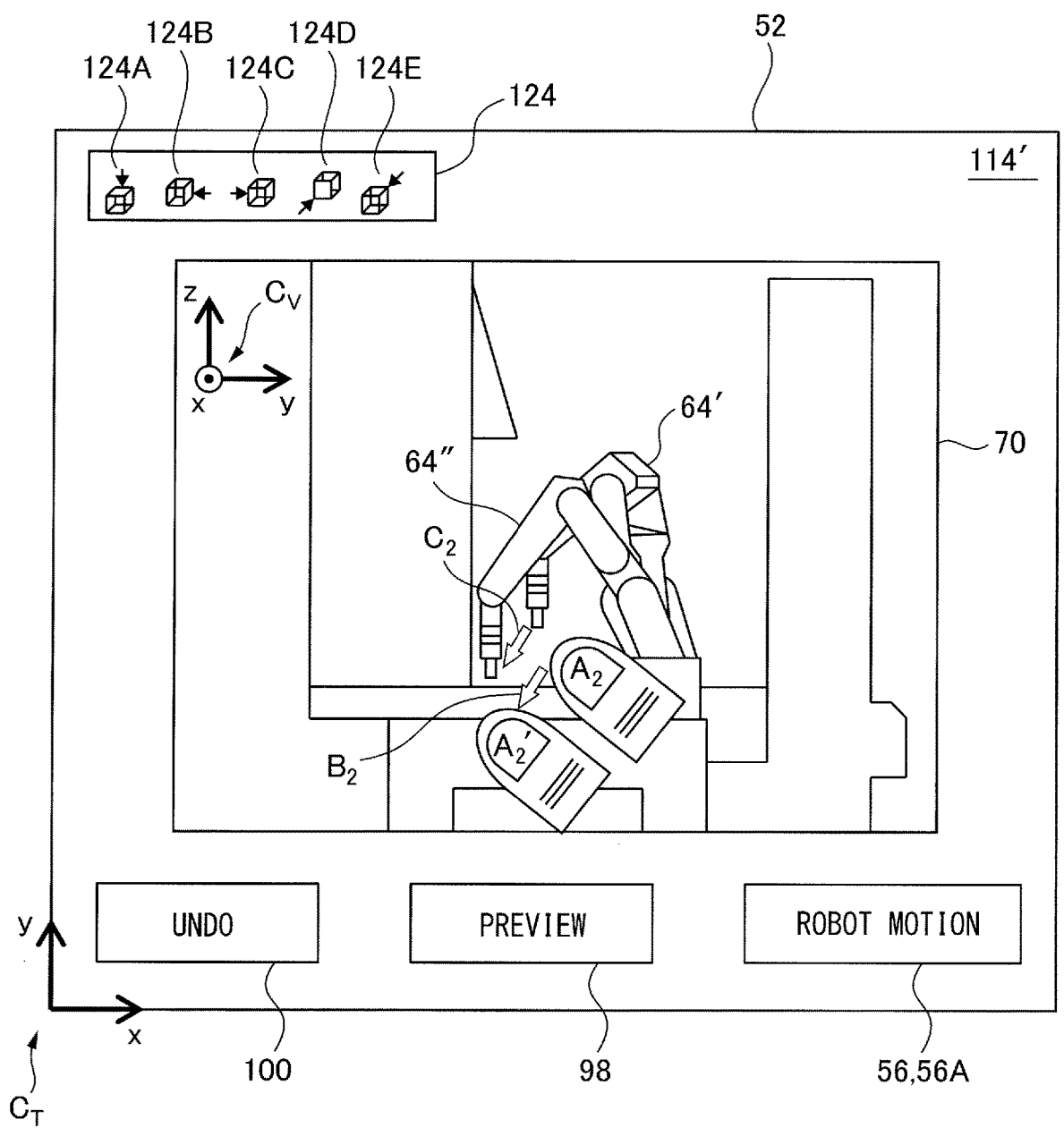
FIG. 13 illustrates the robot model illustrated in FIG. 12, viewed from another direction.

The image 114' illustrated in FIG. 13 depicts an image of the robot model 64' in the virtual space 70 as viewed from the x-axis positive direction of the coordinate system $C_v$, that is different from the direction of view of the image 114 in FIG. 12.

In this way, the image switching section 122 switches the image of the robot model 64, 64' (FIG. 12) to a second image of the robot model 64, 64' (FIG. 13) viewed from a direction different from the original image, in response to the touch input to any of the first to fifth image-switching buttons 124A to 124E.

After switching to the image 114' illustrated in FIG. 13, the user makes a second slide touch input by sliding the finger F from a start point $A_2$ to an end point $A_2'$ in a direction $B_2$.

In response to the second slide touch input, the model motion execution section 54 moves the robot model 64' in the virtual space 70 in the direction $C_2$ to the position and orientation represented by the robot model 64". Along with this, the model motion execution section 54 calculates a second virtual jogging path in the virtual space 70 of each component model of the robot model 64.

Thus, in this embodiment, the user can freely move the robot model 64 in the virtual space 70 by the touch input, along with viewing the 3D robot model 64 shown in the image 114 from various directions. Due to this, the user can carry out the virtual jogging of the robot model 64 more precisely.

Note that, the image switching section 122 may switch the image of the robot model 64' (FIG. 12) when the image switching section 122 detects a double touch input made by touching two different points on the surface of the touch screen 52.

In this case, the user touches the surface of the touch screen 52 with his/her two fingers, concurrently. When the image switching section 122 detects such a double touch input, the image switching section 122 may switch the image of the robot model 64, e.g., from an image viewed from the y-axis positive direction of (FIG. 12) to an image viewed from the x-axis positive direction (FIG. 13).

Further in this case, each time the image switching section 122 detects a double touch input made by the user, the image switching section 122 may switch the image of the robot model 64 in accordance with a predetermined order, e.g., an image viewed from the x-axis positive direction→an image viewed from the x-axis negative direction→an image viewed from the y-axis positive direction→an image viewed from the y-axis negative direction . . .

Alternatively, the image switching section 122 may switch the image of the robot model 64 when the image switching section 122 detects a touch input made by continuously touching at least one point on the surface of the touch screen 52 for a predetermined time. This predetermined time is defined by the user in advance.

Alternatively, the image switching section 122 may switch the image of the robot model 64 when the image switching section 122 detects that a force of a touch input to the touch screen 52 is equal to or greater than a predetermined threshold value.

Figure 9:
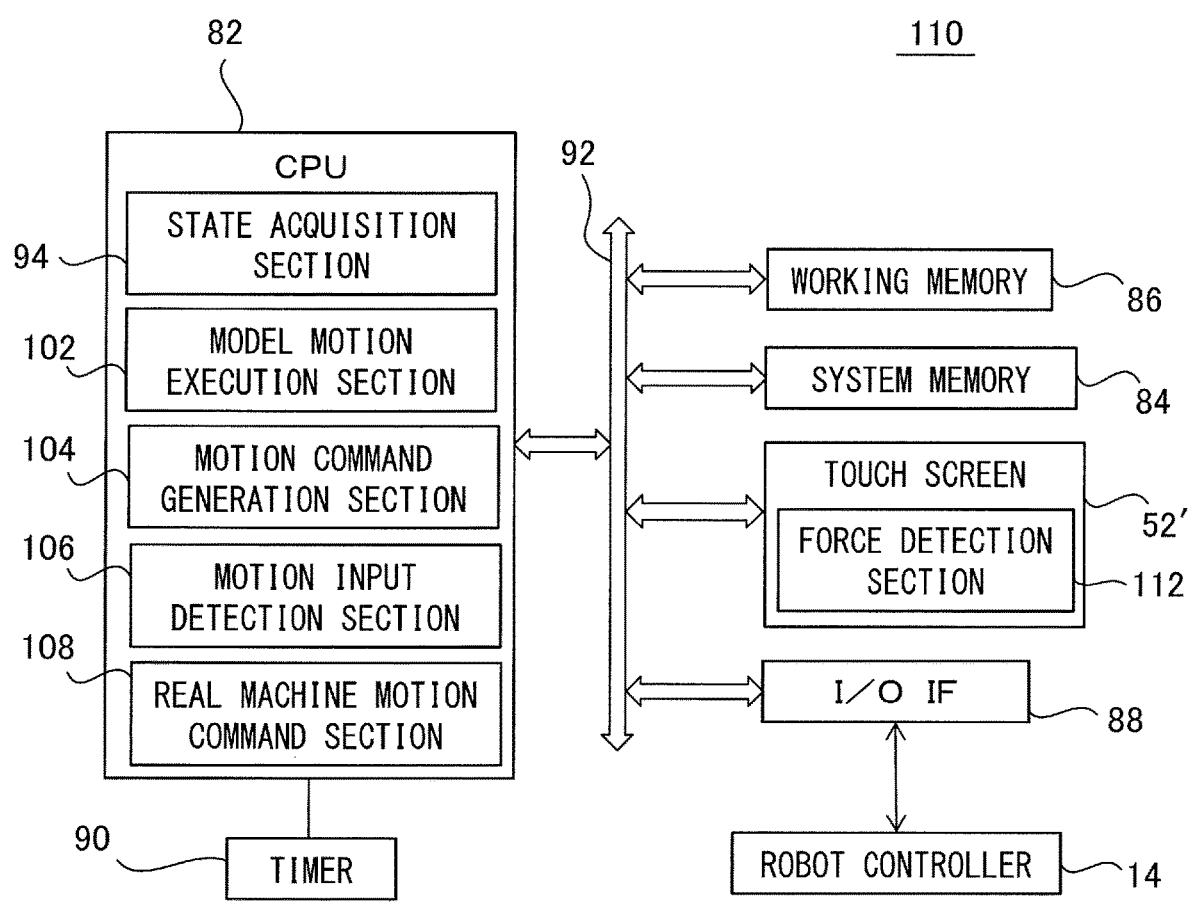
FIG. 9 is a block diagram of an operation device according to yet another embodiment.

For example, the image switching section 122 is applied to the operation device 110 illustrated in FIG. 9. In this case, the CPU 82 of the operation device 110 functions as the image switching section 122. The force detection section 112 detects a force F' of a touch input to a region on the surface of the touch screen 52 other than the display region 56A.

When the CPU 82 determines that the force F' exceeds a predetermined threshold value γ (F'≥γ), the CPU 82 functions as the image switching section 122 and switches the image of the robot model 64, e.g., from an image viewed from the y-axis positive direction (FIG. 12) to an image viewed from the x-axis positive direction (FIG. 13).

Note that, in the above-described embodiments, the robot motion button 56 is displayed on the touch screen 52, 52' as an image. However, the robot motion button 56 may be provided at the operation device 50, 80, 120 so as to be separate from the touch screen 52, 52', in the form of e.g. a mechanical push button.

In this case, the user continuously presses the robot motion button 56 in order to move the robot 12 in the real space. The motion input detection section 58, 106 detects an input of the robot motion button 56, and the real machine motion command section 60, 108 outputs a command (e.g., a motion command or jogging approval command) to the robot controller 14 during the motion input detection section 58, 106 continuously detects the input of the robot motion button 56.

Further, the robot 12 may be a horizontal articulated robot, a parallel link robot, or the like. The robot 12 may be a loader.

Further, the robot model 64, 64', 64" is not limited to 3D, but may be 2D computer graphics. Also, the robot model 64, 64', 64" is not limited to 3DCAD image as illustrated in FIG. 3, but may be simpler diagrams.

Further, the features of the above-described various embodiments may be combined. For example, the image switching section 122 illustrated in FIG. 11 may be applied to the operation device 50, 80, 110, or 120.

The present disclosure has been described with embodiments above but the above-described embodiments do not limit the invention according to the claims.

The invention claimed is:

1. A robot interface device for operating a robot, comprising:
   a touch screen configured to display an image of a robot model modeling the robot and receive a touch input;
   a robot motion button for moving the robot in real space; and
   a processor configured to:
      move the image of the robot model in response to the touch input made by touching a surface of the touch screen;
      move the robot in a real space;
      detect an input of the robot motion button;
      determine whether or not the input of the robot motion button is continuously detected for a predetermined time after detection of the input; and
      start a command output operation to output a command for causing the robot to carry out a motion in the real space that is identical to a motion of the image of the robot model, when the processor determines that input of the robot motion button is continuously detected, and execute the command output operation during the continuous detection of the input of the robot motion button after the start of the command output operation.

2. The robot interface device according to claim 1, wherein the robot motion button is displayed on the touch screen as an image, and
   wherein the processor is further configured to detect a touch input to a display region of the robot motion button on the touch screen as the input of the robot motion button.

3. The robot interface device according to claim 2, wherein the touch screen is configured to detect a force of the touch input to the display region, and
   wherein the processor is further configured to detect the touch input to the display region as the input of the robot motion button when the force detected by the touch screen is equal to or greater than a predetermined threshold value,
   wherein the processor is further configured to determine whether or not the force detected by the touch screen is continuously equal to or greater than the threshold value for the predetermined time after the force has become equal to or greater than the threshold value.

4. The robot interface device according to claim 1, wherein the processor is further configured to acquire a position and orientation of the robot from a robot controller configured to control the robot,
   wherein the touch screen displays the image of the robot model arranged at the position and orientation acquired by the processor, and
   wherein the processor is further configured to move the image of the robot model arranged at the position and orientation acquired by the processor.

5. The robot interface device according to claim 1, wherein the processor is further configured to generate a motion command to be transmitted to the robot to cause the robot to carry out the identical motion in the real space, based on a start point and an end point of the touch input made by touching the surface of the touch screen.

6. The robot interface device according to claim 1, wherein the processor is further configured to switch the image of the robot model of three-dimension to a second image of the robot model viewed from a direction different from the image, in response to a predetermined type of touch input to the touch screen.

7. The robot interface device according to claim 6, wherein the predetermined type of touch input is:
   a touch input to a display region of an image-switching button displayed on the touch screen for switching the image of the robot model to the second image;
   a touch input made by touching two different points on the touch screen; or
   a touch input made by continuously touching at least one point on the touch screen for a predetermined time.

8. A robot system comprising:
   a robot;
   a robot controller configured to control the robot; and
   a robot interface device, that is communicably connected to the robot controller, the robot interface device comprising:
      a touch screen configured to display an image of a robot model modeling the robot and receive a touch input;
      a robot motion button for moving the robot in real space; and
      a processor configured to:
         move the image of the robot model in response to the touch input made by touching a surface of the touch screen;
         move the robot in a real space;
         detect an input of the robot motion button;
         determine whether or not the input of the robot motion button is continuously detected for a predetermined time after detection of the input; and
         start a command output operation to output a command for causing the robot to carry out a motion in the real space that is identical to a motion of the image of the robot model, when the processor determines that input of the robot motion button is continuously detected, and execute the command output operation during the continuous detection of the input of the robot motion button after the start of the command output operation.

9. A method of operating a robot, comprising:
   displaying, by a touch screen, an image of a robot model modeling the robot, the touch screen configured to receive a touch input;
   moving, by a processor, the image of the robot model in response to the touch input made by touching a surface of the touch screen;
   detecting, by the processor, an input of a robot motion button for moving the robot in a real space;
   determining, by the processor, whether or not the input of the robot motion button is continuously detected for a predetermined time after detection of the input; and
   starting, by the processor, a command output operation to output a command for causing the robot to carry out an identical motion in the real space to a motion of the robot model, when it is determined that the input of the robot motion button is continuously detected, and executing the command output operation during continuously detecting the input of the robot motion button after the start of the command output operation.

* * * * *